3,091,635
ALKYLATION PROCESS
Herman D. Kluge, Fishkill, and Fred W. Moore, Wappingers Falls, N.Y., assignors to Texaco Inc., a corporation of Delaware
No Drawing. Original application Nov. 29, 1954, Ser. No. 471,920, now Patent No. 2,868,823, dated Jan. 13, 1959. Divided and this application Apr. 3, 1958, Ser. No. 726,038
2 Claims. (Cl. 260—515)

This invention relates to alkylation, and more particularly to novel alkylation catalyst, preparation thereof, and process adapted to its use. This application is a division of our copending patent application having Serial No. 471,920, filed on November 29, 1954, now U.S. 2,868,823 issued January 13, 1959, and entitled "Improved Alkylation Catalyst."

Our novel alkylation catalyst consists essentially of material having the general formula $AlCl_2.RSO_3$ wherein $RSO_3$ stands for a hydrocarbyl sulfonic acid residue, i.e. the radical resulting when the active hydrogen atom is detached from the corresponding sulfonic acid. The catalyst is the reaction product of substantially equimolecular quantities of $AlCl_3$ and a sulfonic acid or mixed sulfonic acids; thus it may be a single compound or a mixture of related substances.

Our catalyst is suitable for homogeneous blending with an alkylation mixture, e.g. in the alkylation of aryl or aliphatic compounds, with olefinic hydrocarbons or alkyl halides. The solubility of the catalyst makes it possible to perform direct alkylations with minimum of facilities and operating expense for agitation. Other advantages recommending its use include low sludge formation, ease and smoothness with which the alkylation reaction can be controlled, operational effectiveness at moderate temperature, and ease of recovery of unreacted olefinic materials from the reaction mixture.

Acidically-reacting aryl compounds, i.e. those having $pK_{a_1}$ at 25° C. up to about 12, such as phenol, cresol, xylenol, hydroquinone, pyrogallol, naphthols and other mono and polyhydroxy aromatics including polynuclear ones and acids such as phthalic, salicylic and benzoic are typical aryl compounds suitable for direct alkylation using our catalyst, especially for production of high molecular weight aryl products having alkyl side chains of 7–40 carbon atoms. Our process comprises reacting such an oxygenated aromatic compound with an olefinic hydrocarbon in the presence of the aforementioned catalyst until an alkylated oxygenated aromatic is formed, and separating said alkylated oxygenated aromatic compound from the resultant mixture.

The alkyl hydroxy aromatic compounds, such as alkyl phenols having one or more high molecular weight side chains, are intermediates for preparation of lubricating oil additives and sulfonated detergents. Suitable long chain olefins for the practice of the process can be products or byproducts of petroleum processing, preferably those produced synthetically by the polymerization of lower olefins such as propylene with hydrated $BF_3$ catalyst at about 150° F. The resulting polymers can be separated into fractions of desired molecular weight.

In our process mol ratio of the aryl compound for alkylation:olefinic hydrocarbon can be between about 2:1 and about 6:1. Suitable mol ratios of the aryl compound for alkylation:catalyst are about 1:.01 to 1:0.3, preferably about 1:0.2 for efficiency and economy in the practice of our process.

The catalyst can be prepared from alkane or aryl sulfonic acids selected to obtain desired solubility in a particular alkylation reaction mixture. In general, use of alkane sulfonic acids is preferred in catalyst preparation because of their good solubility characteristics and their availability. To insure substantially complete conversion to the desired catalytic composition about equimolecular quantities of acid and anhydrous $AlCl_3$ are used with steady agitation and evolution of HCl at moderately elevated temperature (100–160° F.).

Product separation from the reaction mixture can be done, for example, by washing the cooled reaction mixture with dilute mineral acid followed by aqueous sodium bicarbonate solution and refluxing with an excess of an alkali metal hydroxide, acidifying with concentrated mineral acid, washing with water until neutral, and fractionally distilling the neutral mixture. Removal of acid or acid-forming material from the crude reaction product is necessary prior to distillation to prevent decomposition of the alkylated product. In some instances where distillation of the product is unnecessary, the caustic refluxing can be dispensed with.

The alkane sulfonic acids ordinarily used for catalyst preparation are, for efficiency and economy, mixed materials having alkyl radicals of about 2 to 4 carbon atoms, but lower or higher alkane sulfonic acids can also be used. Materials of construction for the catalyst preparation are preferably corrosion resisting materials such as glass and ceramic; for the alkylation reactor the same materials can be used.

The following examples show ways in which our invention has been practiced but is not to be construed as limiting the invention.

Example 1

Anhydrous $AlCl_3$, 0.441 mol, was placed in a 1 liter glass beaker and warmed on a steam bath to about 75° F. 47.5 grams (0.441 mol) of alkane sulfonic acids having average alkyl chain length of between 2 and 3 carbon atoms and neut. No. of 509–496, was added in successive small portions with agitation maintained between additions. After the entire quantity of sulfonic acids was added agitation was continued. The mixture was warmed to about 100° F. and a copious evolution of HCl ensued. The product, at first a moist powder, dried as agitation was continued and as the evolution of HCl subsided. Dry powdered product, mixed aluminum dichloride-alkane sulfonate weighing 87 grams was ground and stored under substantially anhydrous conditions.

Example 2

163 grams of dry catalyst powder prepared according to the manner of Example 1 was dissolved in 818 grams (8.7 mols) of phenol at temperature rising from 70° to 80° in ½ hour with agitation. A clear red solution resulted. Then 695 grams (2.9 mols) of propylene polymer, having average carbon chain length of 17 and boiling range of 250°–265° F. at 10 mm. Hg absolute, was added to the mass. A deep red solution resulted and temperature thereof was maintained at 80° C.±1° C. for 24 hours. At the end of this period the reaction mixture was cooled, washed with dilute warm HCl, washed with aqueous sodium bicarbonate, refluxed 4½ hours with 560 grams (10 mols) KOH in 500 ml. water and 100 ml. ethanol, acidified with concentrated HCl, washed twice with hot dilute HCl, then washed with hot water until neutral to Congo red. A small quantity of ethanol was added to solubilize water remaining in the mixture and so prevent "bumping" in the distillation to follow. This mixture was stripped of low boiling material by distillation. The residue was fractionally distilled under reduced pressure to yield purified alkylated phenol which analyzed to molecular weight of 333–337 and hydroxyl number of 179. Yield of the alkylated phenol, 17 carbon atoms in its side chain, was 75% of the theoretical yield of 2.9 mols of alkylated phenol.

Obviously many modifications and variations of the invention, as hereinbefore set forth, may be made without departing from the spirit and scope thereof and, therefore, only such limitations should be imposed as are indicated in the appended claims.

We claim:

1. In a process for the direct alkylation of an acidically-reacting aryl compound selected from the group consisting of hydroxylated and carboxylated aryl hydrocarbons with an olefinic hydrocarbon, the improvement which comprises forming a homogeneous reaction mixture of the acidically-reacting aryl compound, the olefin, and a catalyst of the general formula $AlCl_2 \cdot RSO_3$ wherein $RSO_3$ stands for an alkane sulfonic acid residue, the mol ratio of the acidically-reacting aryl compound to olefin being between 2:1 and 6:1 and the mol ratio of acidically-reacting aryl compound to catalyst being between 1:0.01 and 1:0.3, carrying out the alkylation reaction with said mixture until an alkylated derivative of said acidically-reacting aryl compound is formed, and separating said alkylated derivative from the resulting mixture.

2. The process of claim 1 wherein the alkane sulfonic acid residue has an alkyl radical of 2–4 carbon atoms.

References Cited in the file of this patent

UNITED STATES PATENTS

| | | |
|---|---|---|
| 2,149,759 | Cantrell | Mar. 7, 1939 |
| 2,332,555 | Buc | Oct. 26, 1943 |
| 2,389,550 | Ross et al. | Nov. 20, 1945 |
| 2,390,835 | Hennion et al. | Dec. 11, 1945 |
| 2,428,745 | Stillson | Oct. 7, 1947 |
| 2,671,117 | Kluge et al. | Mar. 2, 1954 |
| 2,733,274 | Cowie | Jan. 31, 1956 |
| 2,868,823 | Kluge et al. | Jan. 13, 1959 |